Figure 1:
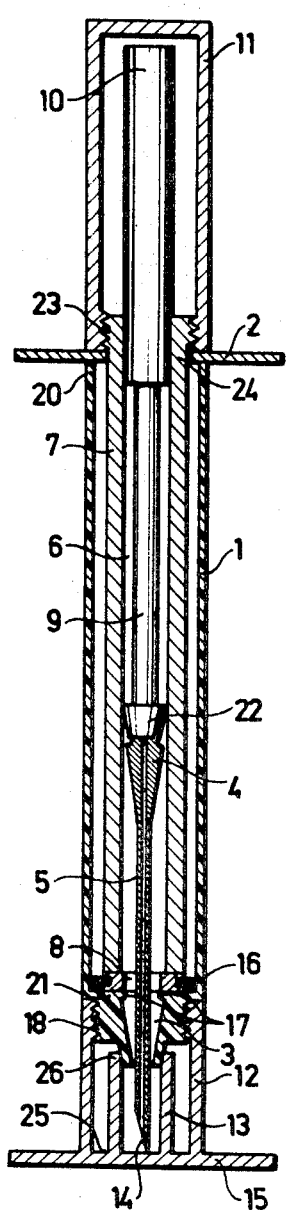

United States Patent

[11] 3,584,626

| [72] | Inventor | Lars Georg Johansson<br>Notsater; Skarhamn, Sweden |
|---|---|---|
| [21] | Appl. No. | 755,567 |
| [22] | Filed | Aug. 27, 1968 |
| [45] | Patented | June 15, 1971 |
| [32] | Priority | Nov. 22, 1967 |
| [33] | | Sweden |
| [31] | | 16,033/67 |

[54] HYPODERMIC SYRINGE
5 Claims, 3 Drawing Figs.

[52] U.S. Cl. .................................................. 128/218,
128/221
[51] Int. Cl. ........................................................ A61m 5/32
[50] Field of Search ........................................... 128/214.4,
218, 218 M, 218 N, 218 NV, 218 P, 218.1, 220,
221

[56] References Cited
UNITED STATES PATENTS

| 2,408,323 | 9/1946 | Lockhart .................... | 128/220 |
| 2,489,600 | 11/1949 | Tydings et al. ............... | 128/218.1 |
| 2,607,341 | 8/1952 | Brown ......................... | 128/218 NV |
| 2,725,057 | 11/1955 | Lockhart .................... | 128/218 NV |
| 2,869,544 | 1/1959 | Ratcliff et al. ............... | 128/220 |
| 2,880,725 | 4/1959 | Kendall ........................ | 128/218 N |

FOREIGN PATENTS

| 1,081,785 | 6/1954 | France ......................... | 128/218 N |
| 106,560 | 11/1899 | Germany ...................... | 128/218 |

*Primary Examiner*—Joseph S. Reich
*Attorney*—Albert M. Parker

ABSTRACT: A hypodermic syringe having a syringe body, a piston rod arranged movably in said body and an injection needle, in which the injection needle is housed inside said syringe body prior to the use of the syringe and when moved into its injection position is brought into sealing abutment with a seating arranged in the syringe body.

PATENTED JUN 15 1971    3,584,626

HYPODERMIC SYRINGE

This invention is concerned with a hypodermic syringe comprising an injection needle, a syringe body and a stem or piston rod arranged for axial movement therein.

One purpose of the invention is to provide a hypodermic syringe in which the injection needle can be protected against mechanical damage during storage and transport whilst retaining the sterilized condition of the needle prior to the use of the syringe. One special purpose of the invention is to provide a hypodermic syringe in which the injection needle can be brought into the injection position in a simple manner when the syringe is used.

According to the invention the above purposes are realized in that prior to the syringe being used the injection needle is housed substantially inside the syringe body and is adapted to be moved into injection position. When the needle is brought into injection position the holder of the injection needle is brought into sealing abutment with a seating arranged in the syringe body. Another essential advantage afforded by a hypodermic syringe of this nature is that because the injection needle is situated within the syringe body the total length of the syringe during transport and storage is much less than that of hitherto known hypodermic syringes.

In one preferred embodiment of the invention injection needle is arranged so as, to be axially displaceable in a recess located axially in the piston rod and is adapted to be moved into the injection position by means of a piston which is capable of moving axially in the recess. The said piston, prior to moving the injection needle into the injection position, abuts at its one end against the needle holder and at its other end projects out into the rear portion of the syringe body. The portion of the piston which projects out of the syringe body is enclosed by a protective sleeve which is detachably secured on the syringe body. The end of the injection needle projecting out of the syringe body seating is enclosed in a protective cap which is detachably secured on the syringe body and which is adapted to be connected to the portion of the piston rod projecting out of the rear end of the syringe body after the injection needle has been moved into the injection position.

Figure 2:
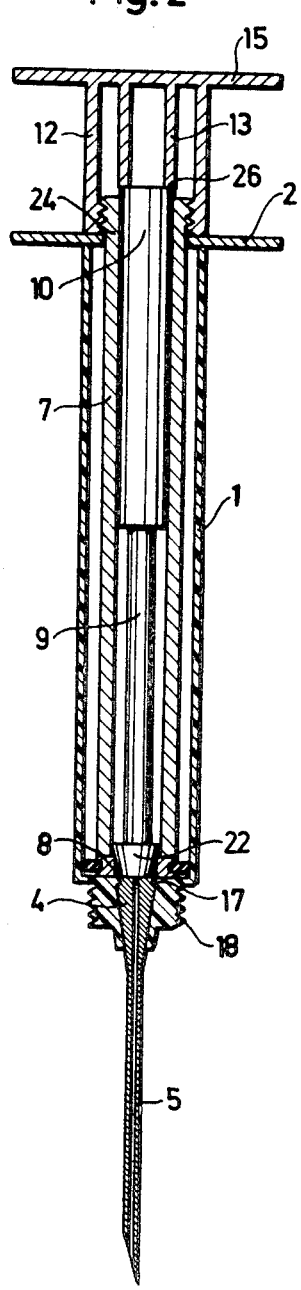
Figure 3:
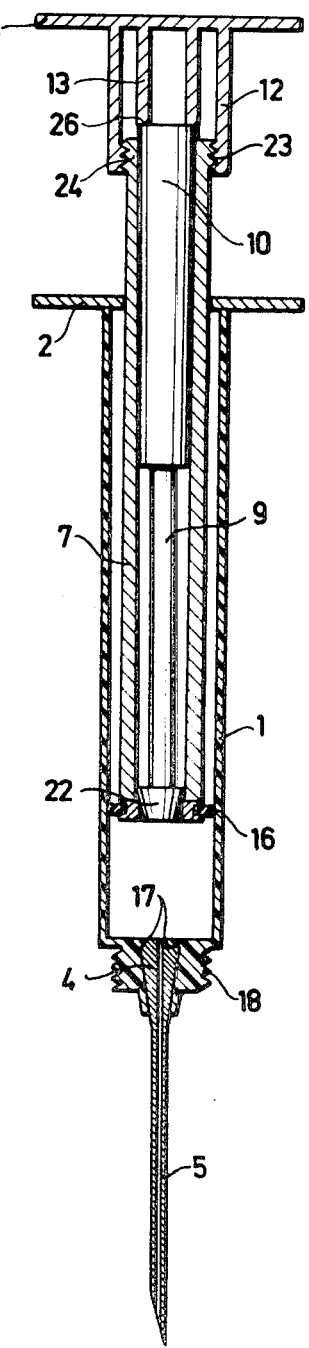

The invention will be described below by reference to the enclosed drawing, in which FIG. 1 shows a longitudinal section through a hypodermic syringe according to the invention with the injection needle in its withdrawn position, FIG. 2 is a longitudinal section of the hypodermic syringe shown in FIG. 1 with the injection needle in a drawn out position, and FIG. 3 shows the hypodermic syringe during the operation of wing injection fluid into said syringe.

In the drawing the reference numeral 1 identifies the syringe body, which in a known manner is provided at its rear end 20 with a thumb grip 2. The front portion 21 of the syringe body 1 passes into a conically tapering seat 3, intended to receive a correspondingly shaped needle holder 4 for an injection needle 5 which, prior to using the syringe, is kept withdrawn in the syringe body 1 within a longitudinally extending hole 6 formed through a piston rod 7, which is arranged for axial movement in the syringe body 1. The end of the piston rod 7 nearest the seating 3 presents a central opening 8 which is somewhat larger in diameter than the needle holder. Abutting the needle holder 4 is a conically tapering front portion 22 of a piston 9 the opposite end 10 of which, when the injection needle 5 is in the withdrawn position, projects out of the rear end 20 of the syringe body 1. Prior to using the syringe the end 10 of the piston 9 is enclosed by a protective sleeve 11 extending from the rear end 20 of the syringe body 1. The protective sleeve 11 is detachably secured on a thread 23 arranged on the portion 24 of the piston rod 7 projecting out of the rear end 20 of the syringe body 1. Positioned on the front end 21 of the syringe body 1 is a protective cap 12, which is detachably secured on a thread 18 and which presents two internal, spaced guides 13 which extend from the closed end 25 of the protective cap 12 and are intended to enclose the front end 14 of the injection needle 5 when in the storage position. When using the syringe, i.e. subsequent to moving the injection needle 5 into the injection position, the protective sleeve 12 is screwed onto the thread 23, whereupon the free ends 26 of the guides 13 are brought into abutment with the portion of the piston 9 projecting out of the rear end 20 of the syringe body 1. The protective cap 12 is also provided with external side flanges 15 serving as a thumb grip. The front portion 22 of the piston 9 abutting the needle holder 4 tapers conically towards said needle holder 4 and is intended to seal the opening 8 against the ingress of liquid when the needle has been moved into the injection position. The front end of the piston rod 7 is provided in a known manner with a peripheral sealing ring 16, intended to sealingly abut the inner surface of the syringe body 1. The seat 3 is provided at its widest portion with inwardly directed resilient lip or projection 17, which deforms to allow the tapering needle holder 4 to pass forward to the injection position of the needle as shown in FIG. 2, and then move behind the needle holder into a recess provided at the rear end of the needle holder 4 by an inwardly stepped shoulder to maintain the needle holder in the fully extended position. The recess formed behind the shoulder of the needle holder 4, as shown in the drawing, smugly receives the projection or lip 17 to hold the needle firmly in place. It will be obvious to those skilled in the field of plastics that the lip 17 will permit movement of the tapering front portion of the needle holder 4 when the holder is advanced, but will resist inward movement of the sharply angled shoulder.

The above-described arrangement functions in the following manner:

Before the syringe is used the injection needle 5, as is shown in FIG. 1 is located essentially within the syringe body 1 and the point 14 of the needle, which projects out of the syringe body 1 is completely enclosed by the protective cap 12, screwed onto the thread 18 arranged externally on the seat 3. When using the syringe, the front protective cap 12 is unscrewed from the thread 18 and the rear protective casing 11 is unscrewed from the thread 23 arranged on the rear end of the piston rod 7, whereafter by pressing the portion of the piston 9 projecting out of the rear end of the syringe body the injection needle 5 is caused to move through the opening 8 until the needle holder 4 abuts the seating 3. The rear end of the needle holder 4 is fixed in its extended position by the projections 17 arranged on the seat 3. The protective cap 12 is then screwed onto the end of the piston rod 7 projecting out of the syringe body 1, i.e.on the same thread 23 which previously secured the protective sleeve 11. Hence the guides 13 abut the piston 9, and the front end of the piston 9, which is now situated in the opening 8, can be controllably urged, according to the extent to which the cap 12 is screwed on, into the opening 8 to obtain a liquid tight seal therewith. The hypodermic syringe is now ready for use in the normal manner; suction of injection liquid into the syringe being effected b axial displacement of the piston rod 7 by means of the protective cap 12 connected therewith. The necessary sealing between the inner wall of the syringe body 1 and the piston rod 7 is obtained by means of the seal ring 16. If desired either the conical front portion 22 of the piston 9 or the opening 8 may be provided with a suitable covering in the form of a rubber ring or the like, for sealing purposes.

The invention has been shown in a single preferred form and by way of example and obviously many modifications and variations can be made within the spirit of the invention. The invention is not to be limited to any specified form or embodiment except insofar as such limitations are set forth in the appended claims.

What I claim is:

1. A hypodermic syringe comprising a tubular body, a hollow, open-ended tubular piston mounted for axial movement within said body and in sealing engagement therewith, an injection needle axially mounted within said tubular piston and extensible from said body through an aperture in one end portion of said body, said aperture defining a seat in sealing engagement with said needle when said needle is fully extended from said body, a further piston mounted for axial movement within said tubular piston and having means in engagement with said needle operable to cause movement of said needle from its initial position within said tubular piston to its fully extended position, said engagement means being sealingly receivable by the end of said tubular piston proximate to said aperture, first abutment means for moving said tubular piston relative to said body and second abutment means for moving said further piston relative to said tubular piston.

2. A syringe according to claim 1, wherein one end portion of said tubular piston extends from the end of said body remote from said aperture, and the end portion of said further piston remote from said aperture is extendable through said one end of said tubular piston.

3. A syringe according to claim 2, wherein, when the needle is in its initial position, a tip of said needle extends through said aperture and the said remote end portion of the said further piston extends from the said one end of said tubular piston, said syringe further comprising first protective cap means detachably mountable on the said one end portion of said body to protect the tip of the needle, and second protective cap means detachably mountable on the said one end portion of said tubular piston to protect the said remote end portion of said tubular piston, said first protective cap means also being detachably mountable on said one end portion of the tubular piston, in place of said second protective cap means, when needle is in its fully extended position.

4. A syringe according to claim 3, wherein the other proximate end portion of said further piston includes a conical portion defining said engagement means, the other end portion of said tubular piston includes a seating for said conical portion, and said first protective cap means includes means engageable with said remote end of said further piston when said first protective cap means is mounted on the said end portion of said tubular piston to urge said conical portion into sealing engagement with the said seating.

5. A syringe according to claim 1, wherein the needle is retained in its fully extended position by a projection defined at said seat.